(12) United States Patent
Conrad et al.

(10) Patent No.: US 6,827,193 B2
(45) Date of Patent: Dec. 7, 2004

(54) ADJUSTABLE FRICTION TORQUE DEVICE

(75) Inventors: John D. Conrad, Auburn, IN (US);
Roger E. Knueve, Convoy, OH (US);
Martin E. Kummer, Auburn, IN (US);
Glen A. Pepple, Corunna, IN (US);
David L. Rollins, Auburn, IN (US);
Daniel V. Gochenour, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/370,155

(22) Filed: Feb. 19, 2003

(65) Prior Publication Data

US 2004/0159522 A1 Aug. 19, 2004

(51) Int. Cl.[7] ............................................... F16D 13/75
(52) U.S. Cl. .............................. 192/70.25; 192/111 A; 192/111 B
(58) Field of Search .......................... 192/70.25, 111 A, 192/111 B

(56) References Cited

U.S. PATENT DOCUMENTS

| | | | | |
|---|---|---|---|---|
| 3,754,628 A | * | 8/1973 | Hildebrand | .............. 192/111 B |
| 4,832,164 A | * | 5/1989 | Flotow | ................... 192/111 B |
| 4,848,550 A | * | 7/1989 | Kitano et al. | .............. 192/99 A |
| 5,213,185 A | | 5/1993 | Flotow | |
| 5,320,205 A | * | 6/1994 | Kummer et al. | ......... 192/70.25 |
| 5,595,274 A | | 1/1997 | Gochenour et al. | |

FOREIGN PATENT DOCUMENTS

GB          2071792 A  *  9/1981  ........... F16D/13/75

* cited by examiner

Primary Examiner—Richard M. Lorence
(74) Attorney, Agent, or Firm—Rader, Fishman & Grauer PLLC

(57) ABSTRACT

A friction torque device includes an adjustment mechanism for adjusting the device in response to wear on a friction surface within the device, and an adjustment limiting member for controlling adjustment thereof. In one embodiment, the adjustment mechanism includes a first cam ring rotatable relative to both a pressure plate and a cover, and a second cam ring engaging the first cam ring on a side of the first cam ring opposite the cover and rotatably fixed relative to the cover. The first cam ring is rotatable with respect to the second cam ring such that ramped surfaces cam against each other to increase the axial displacement of the first and second cam rings, whereby the axial displacement compensates for wear on the friction surface. The adjustment limiting device is selectively engagable with the first cam ring to inhibit rotation thereof.

18 Claims, 10 Drawing Sheets

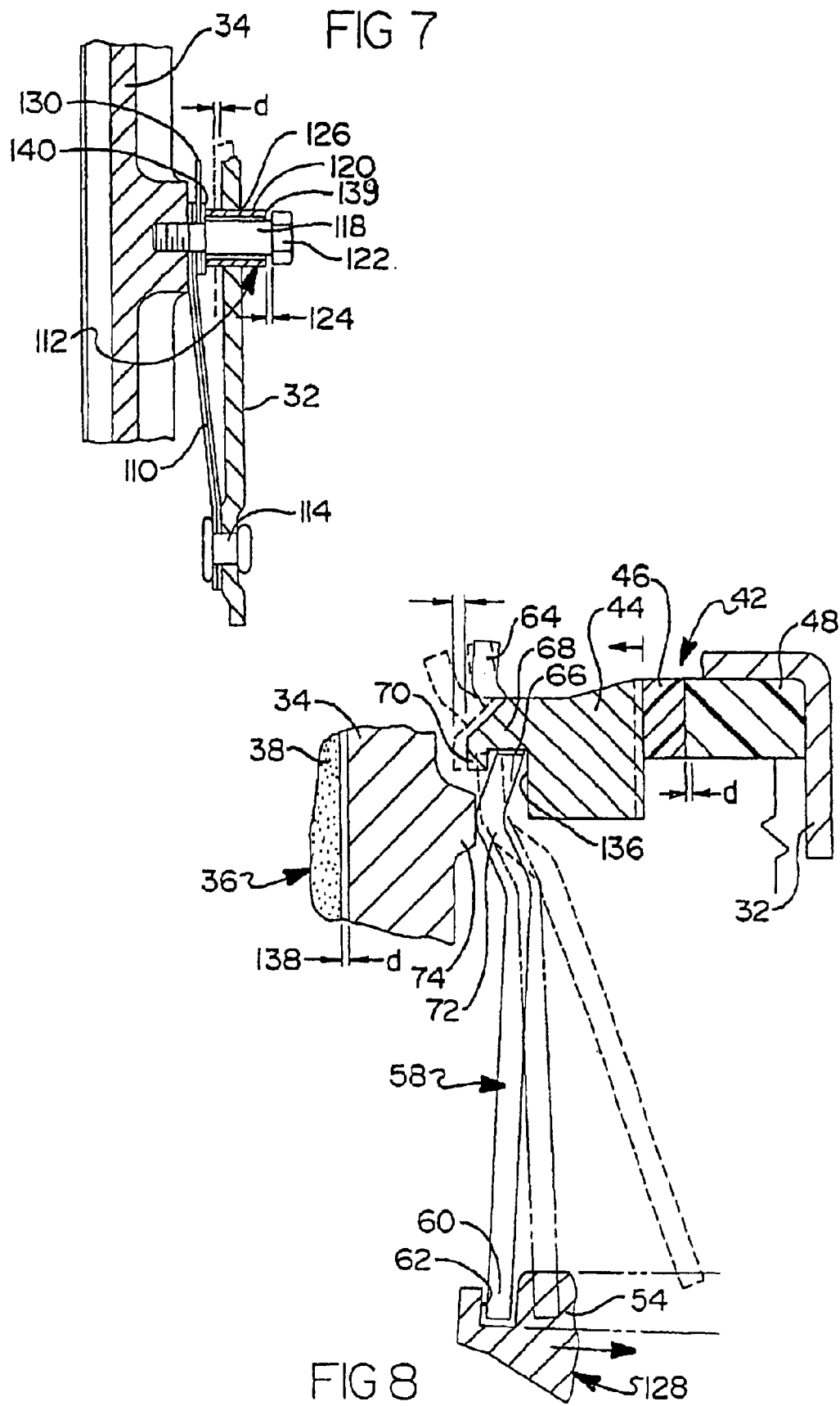

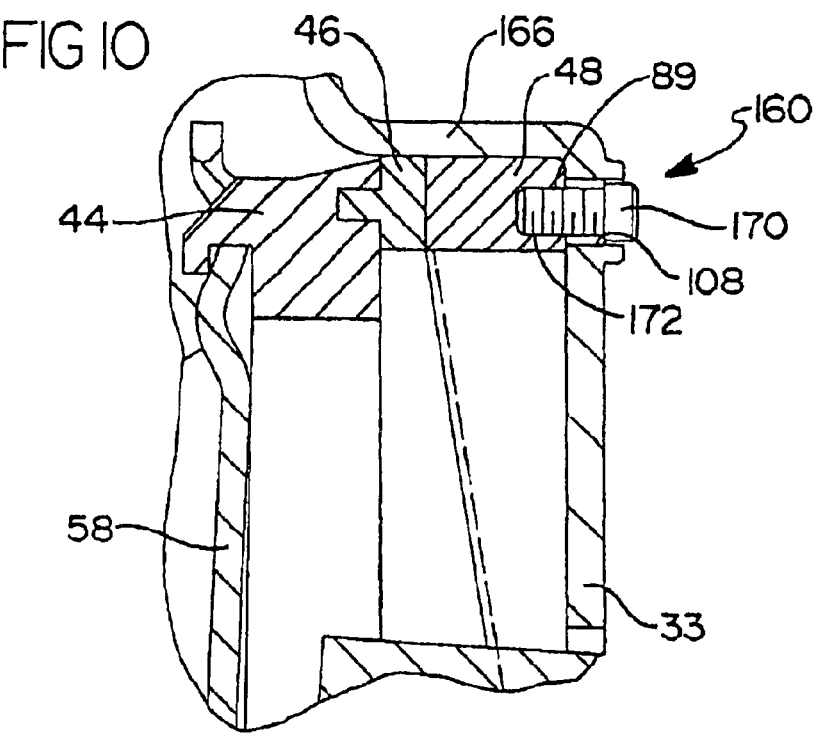
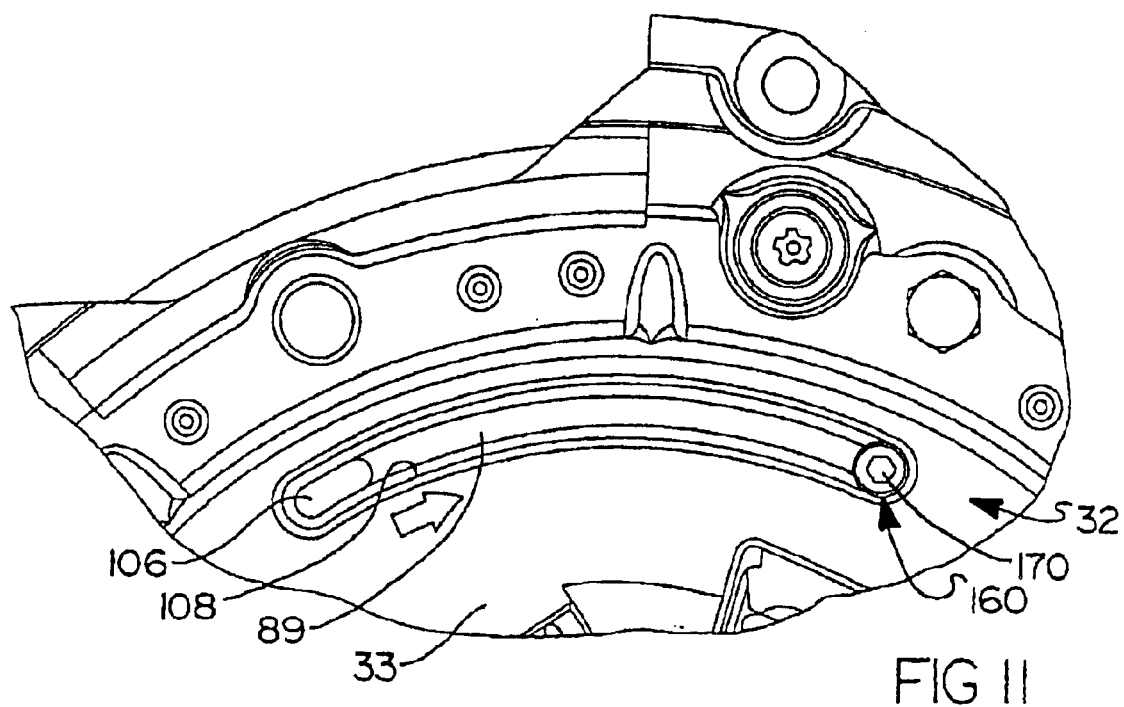

ADJUSTABLE FRICTION TORQUE DEVICE

BACKGROUND OF THE INVENTION

1. Field of the Invention

The present invention relates generally to a friction torque device, and more particularly to a friction torque device that is adjustable to compensate for wear on a friction surface within the device.

2. Description of the Related Art

A friction torque device, such as a friction clutch or brake, provides a releasable torsional connection between a motor vehicle engine flywheel and an associated transmission. In a friction clutch, torque is transmitted from a driving member to a driven member, each member rotating about an axis. The driven member is interposed between the driving member and a pressure plate. In normal operation, a release assembly cooperates with the pressure plate to selectively move the pressure plate axially towards the driven member in order to engage and disengage the clutch. As wear occurs on a friction surface of the driven member, the pressure plate must be moved an additional axial increment to engage the driven member with the driving member. The relative position of the pressure plate must therefore be compensated internally for this additional increment of movement.

It is known in the art to provide a clutch with an automatic adjustment mechanism that compensates for driven disc wear and maintains the clutch engagement force. One type of known adjustment mechanism relies on the relative rotation of two annular cams, each having inclined cam surfaces in engagement with each other. The relative rotation of the cams compensate for wear of the friction material. More particularly, the cams are biased to rotate in a direction that increases a combined height or thickness of the cam portions. The rotative biasing force is induced by a torsional biasing spring functionally disposed between the two cams.

Over time, the friction surfaces in a clutch wear to a point the driven disks need to be replaced, requiring that the clutch be disassembled and remanufactured. Because many motor vehicle configurations are operable with manually adjustable clutches or simply do not justify the added expense of automatic adjustment, many remanufactured automatically adjustable clutches go unsold or are otherwise not utilized. Thus, there is a demand for automatically adjusting clutches that are operable manually or are easily remanufactured into manually adjustable clutches for use in applications that do not functionally require or economically justify automatic adjustment.

SUMMARY OF THE INVENTION

A friction torque device includes an adjustment mechanism for adjusting the device in response to wear on a friction surface of a driven member within the device. The friction torque device transmits torque from a driving member to the driven member, which is coupled to an axially extending driven shaft. A cover is secured to the driving member for rotation therewith. A pressure plate and the driven member are sandwiched between the driving member and the cover. A release assembly extends circumferentially about the driven shaft.

In one embodiment of the present invention, the adjustment mechanism includes a first annular cam ring, a second annular cam ring adjacent the first annular cam ring and an adjustment limiting member for controlling adjustment. Opposed faces of the cam rings include corresponding annular ramped surfaces for camming. The cam rings rotate with respect to each other for axial displacement of the cam rings. The adjustment is a direct function of increased movement of the pressure plate due to wear on friction surfaces, which is triggered by a pin or pin assembly that cooperates with the pressure plate. The increment of wear on the friction surface of driven member is directly translated into a gap between the annular cam rings. The cam rings cam against each other to displace this gap when the clutch is fully disengaged. The adjustment limiting member is selectively engagable with the first cam ring to inhibit rotation thereof and disengageable with the first cam ring to permit adjustment of the friction device.

In another embodiment of the present invention, the adjustment mechanism includes a first annular ring, a second annular ring adjacent the first annular ring and an adjustment limiting member for controlling adjustment. Opposed faces of the first and second rings include corresponding threaded surfaces that function to displace the second ring upon rotation of the first ring. The increment of wear on the friction surface of driven member is directly translated into a gap between the first and second rings. The adjustment limiting member is selectively engagable with the first ring to inhibit rotation thereof and disengageable with the first ring to permit adjustment of the friction device.

In another embodiment of the present invention, the adjustment mechanism includes an adjusting ring having an adjusting thread at an outer peripheral surface and the cover having a cover thread at an inner peripheral surface. The adjusting thread mates with the cover thread such that the adjusting ring is selectively rotatable relative to both a pressure plate and to the cover, and is moveable in an axial direction relative to the cover in response to rotation. The adjusting ring controls an axial displacement of the pressure plate relative to the cover as a function of relative rotative position.

These and other features of the present invention can be best understood from the following specification and drawings, of which the following is a brief description.

BRIEF DESCRIPTION OF THE DRAWINGS

FIG. 7 is a partial, radial cross-sectional view of the adjustable clutch, including a connection pin assembly.

FIG. 8 is an enlarged partial cross-sectional view of a portion of the adjustable clutch.

FIG. 10 is an enlarged partial cross-sectional view of an adjustable clutch according to another embodiment of the present invention.

FIG. 11 is an enlarged partial elevation view of the clutch shown in FIG. 10, illustrating the clutch cover, indicator tab and adjustment limiting member.

DESCRIPTION OF THE PREFERRED EMBODIMENTS

Figure 1:
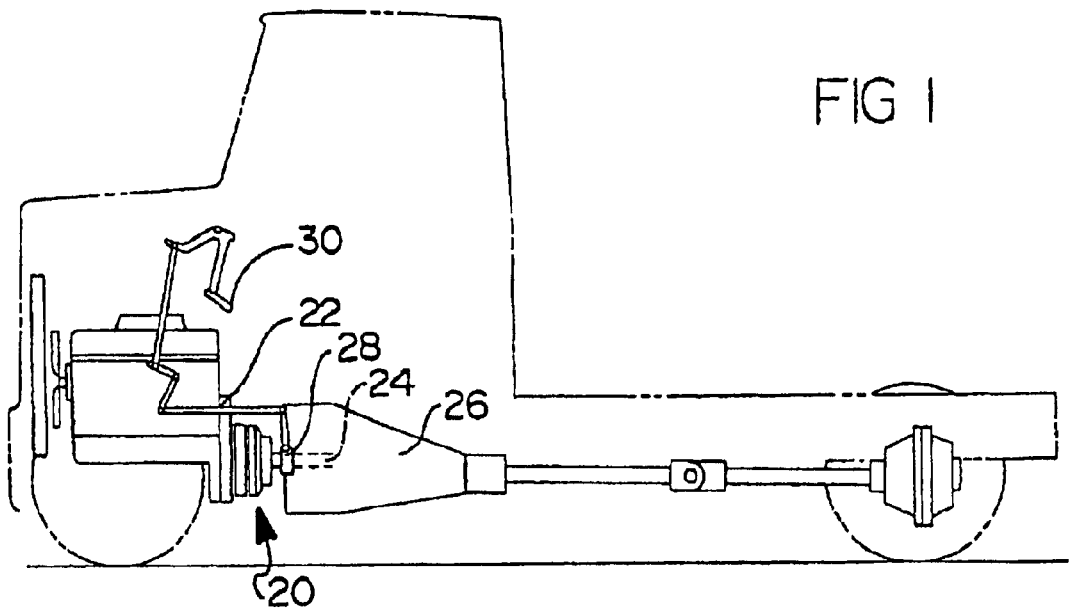
FIG. 1 is an environmental view illustrating an adjustable clutch mounted in a heavy duty vehicle.

Referring now to the drawings, preferred embodiments of the present invention are shown in detail. Referring now to FIG. 1, a friction torque device is shown as a clutch 20, which selectively transmits torque from an engine flywheel 22 to a driven shaft 24 of a vehicle transmission 26. Flywheel 22 is the driving member providing torque that is selectively transmitted to transmission 26. A standard clutch release assembly 28 is employed for affecting clutch disengagement from flywheel 22. Such movement of release assembly 28 is achieved by depression of a clutch pedal 30 in a vehicle cab. In the disclosed embodiment, clutch pedal 30 is mechanically linked to release assembly 28. A full stroke of pedal 30 will fully disengage clutch 20, moving release assembly 28 to an extreme right position.

Figure 2:
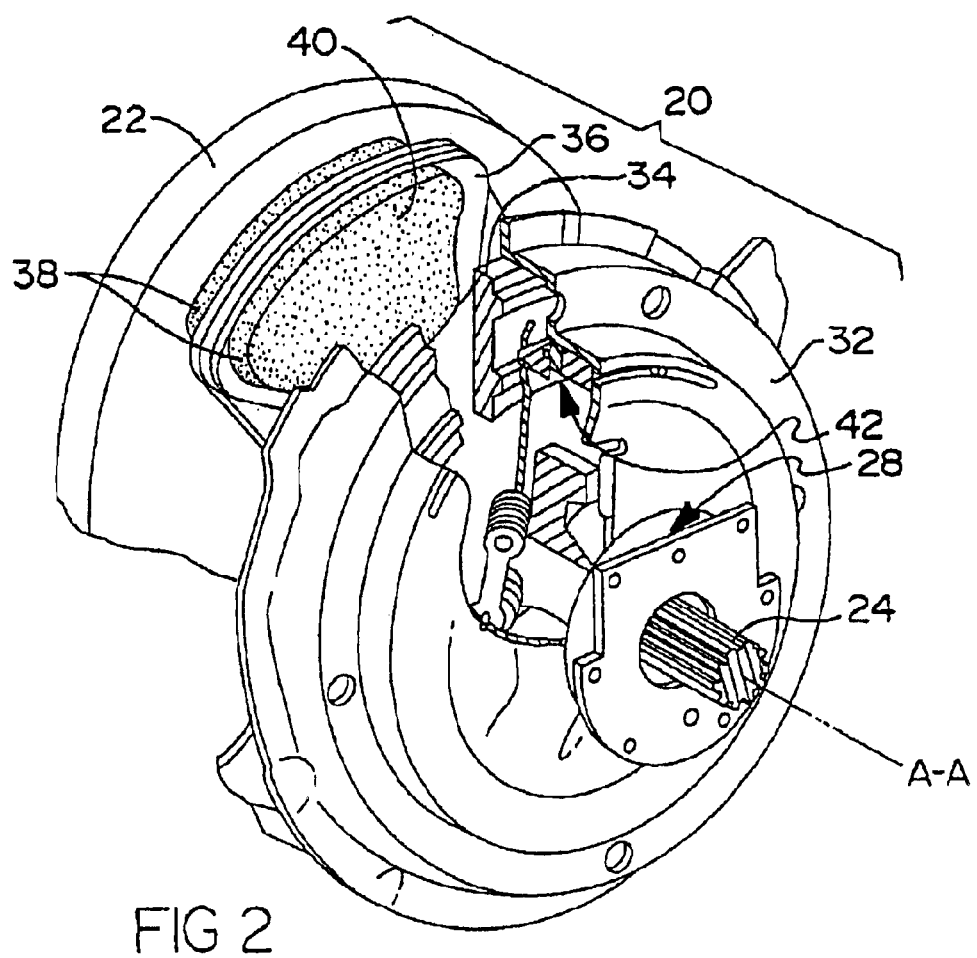
FIG. 2 is a perspective view of the adjustable clutch.
Figure 3:
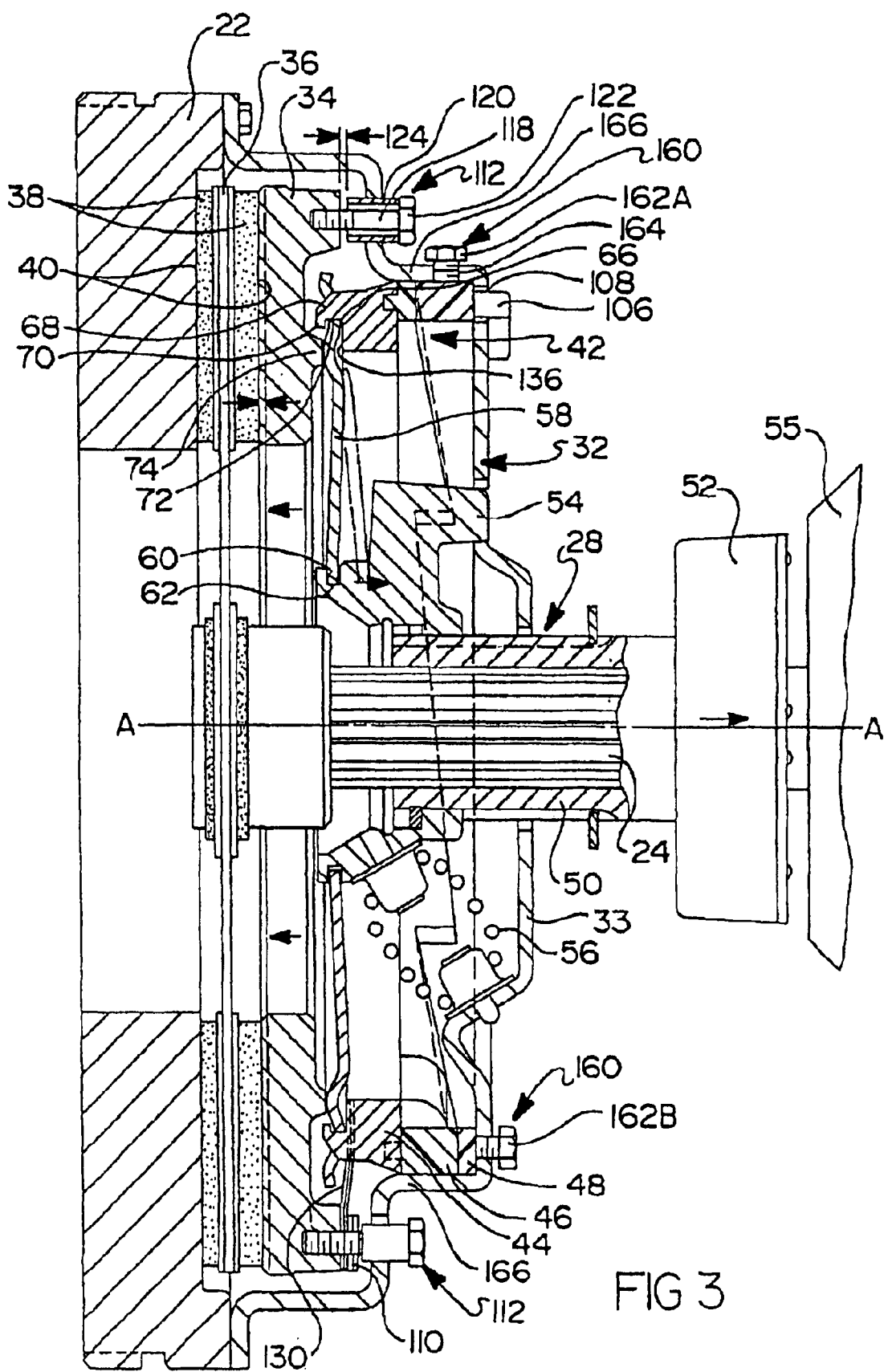
FIG. 3 is a cross-sectional view of the adjustable clutch.

Referring to FIGS. 2 and 3, a clutch cover 32 is fixed to flywheel 22 for rotation therewith. Cover 32 is in a fixed position relative to flywheel 22, and includes a radially extending wall 33 that is spaced from flywheel 22 a fixed distance. A pressure plate 34 and at least one driven member 36 are sandwiched between flywheel 22 and cover 32, which rotate about drive axis A—A. Driven member 36 is rotationally fixed to the axially extending driven shaft 24. A second driven member (not shown) may also be sandwiched between first driven member 36 and flywheel 22, which would require an intermediate plate between the driven members as is known in the art.

As will be apparent to those skilled in the art, pressure plate 34 is selectively moved the left in FIG. 3 to frictionally engage driven member 36, forcing friction member 36 to engage flywheel 22 to transmit torque from flywheel 22 to driven shaft 24. Driven member 36 includes a friction pad 38 on each axial side thereof. In FIG. 2, the relative thickness of friction pad 38 is enlarged to emphasize the effect of wear that occurs on a friction surface 40 of friction pad 38 over the life of clutch 20.

Due to the wear on friction surface 40, driven member 36 must be moved to the left an additional axial distance to engage flywheel 22. During operation of the clutch, and more specifically, when the clutch is fully disengaged, an adjustment mechanism 42 adjusts the clutch to compensate for this wear.

In the embodiment disclosed in FIGS. 2 and 3, adjustment mechanism 42 is annular and includes an adjusting ring 44, a left cam ring 46 rigidly secured to adjusting ring 44, and a right cam ring 48 adjacent left cam ring 46. Adjustment ring 44, left cam ring 46 and right cam ring 48 are concentric with axis A—A. Adjustment mechanism 42 is mounted to cover 32 for rotational movement therewith, but is otherwise axially movable within a limited range. As will be described, right cam ring 48 is mounted for limited rotational movement with respect to adjusting ring 44, left cam ring 46 and cover 32.

Release assembly 28 includes a sleeve 50 positioned circumferentially about driven shaft 24. A pull assembly 52 is carried by sleeve 50 and is secured at one end thereof. A retainer 54 is secured to the opposite end of sleeve 50, and positioned circumferentially about sleeve 50. As shown in FIG. 3, release assembly 28 contacts a transmission housing 55 when moved to an extreme right position. The transmission housing is a stop for release assembly 28, and defines the fully disengaged position of clutch 20. Transmission housing 55 is in a fixed axially spaced location with respect to flywheel 22, and permits release assembly 28 to be returned to a control location for adjustment of clutch 20.

Coil springs 56 are interposed between cover 32 and retainer 54 forming a spring assembly. As is well known in the art, coil springs 56 urge retainer 54 to the left, or engaged position. To engage and disengage the clutch, a plurality of levers 58 are radially interposed between retainer 54 and adjustment mechanism 42. As more clearly seen in FIG. 8, a radially inner portion 60 of each lever 58 is received in a peripheral groove 62 formed in retainer 54. A radially outer portion 64 of each lever 58 has an opening 66 which receives a leftwardly projecting pivot extension 68 formed on a left face of adjusting ring 44. Pivot extension 68 is the extreme left axial end of adjustment mechanism 42. Pivot extension 68 further includes a radial lip 70 extending radially inwardly. Lip 70 assists in securing lever 58 to adjusting ring 44.

A leftwardly extending projection 72 of lever 58 is intermediate the radially inner portion 60 and radially outer portion 64 of each lever. Projection 72 pivotally and pressingly engages an annular shoulder 74 formed on the right side of pressure plate 34. Thus, leftward movement of retainer assembly 28 causes lever 58 to apply a leftward force on pressure plate to engage the clutch members.

Figure 4:
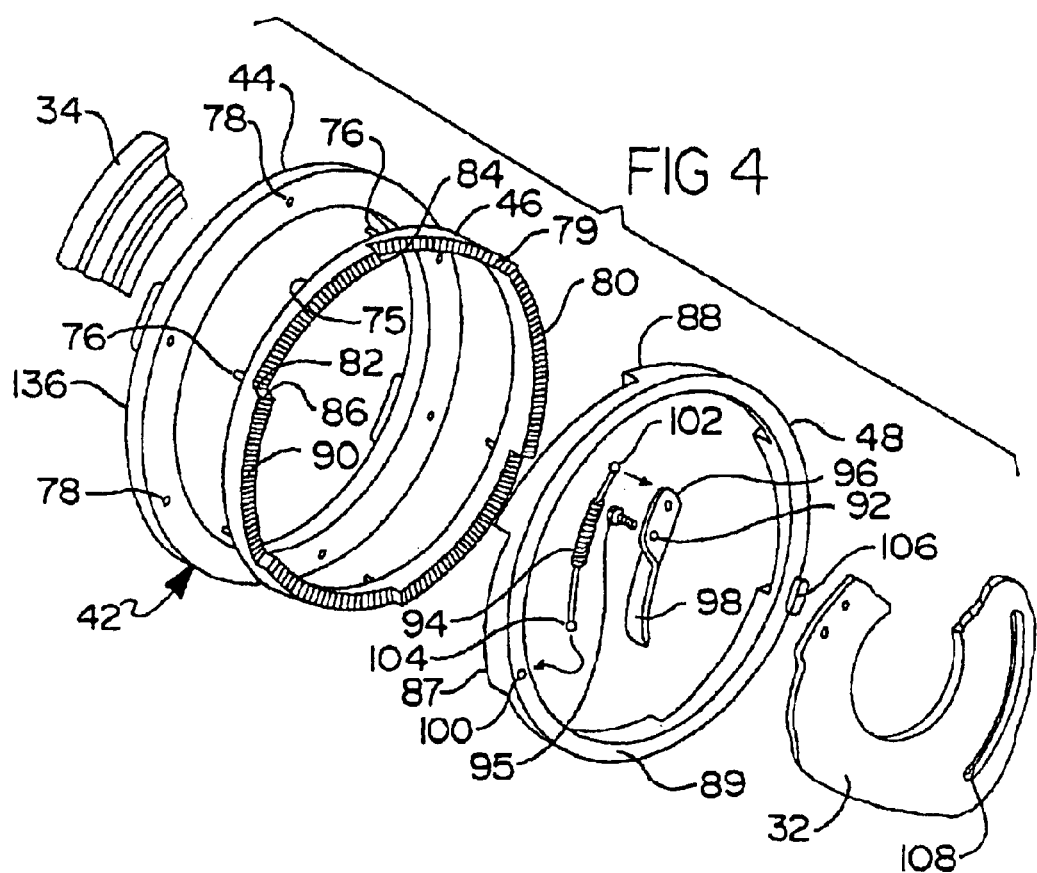
FIG. 4 is an exploded perspective view of an adjustment mechanism within the clutch.
Figure 5:
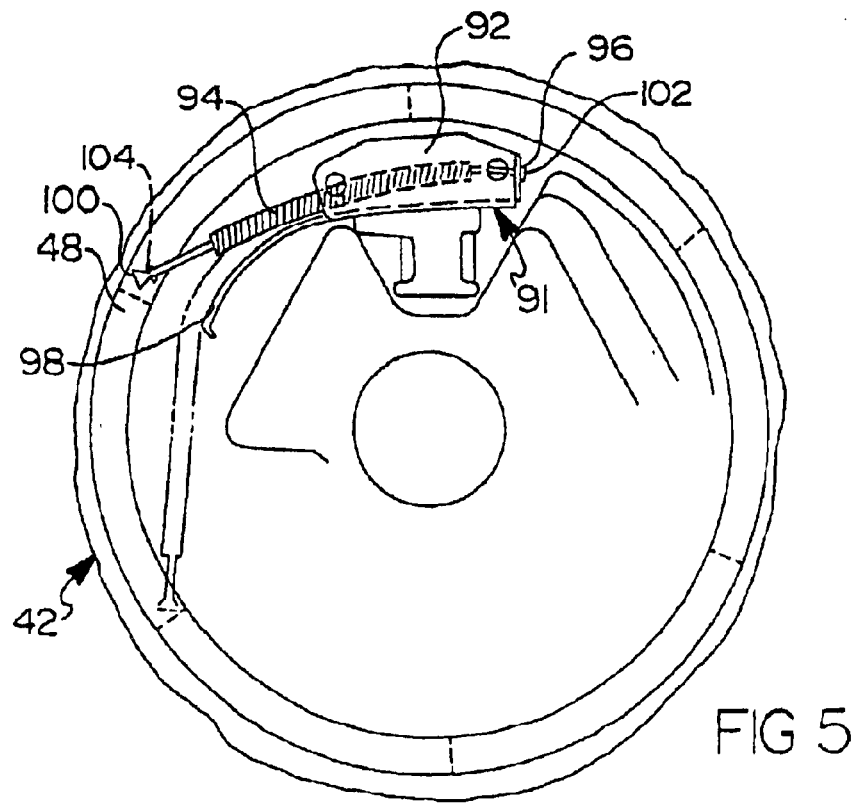
FIG. 5 is a fragmentary plan view of the adjustment mechanism.

Referring now to FIGS. 4 and 5, an axial face 75 of left cam ring 46 includes a plurality of studs 76 each extending into a corresponding aperture 78 formed in adjusting ring 44 to fixedly secure left cam ring 46 to adjusting ring. Adjusting ring 44 and left cam ring 48 are rotationally fixed to cover 32, but are otherwise permitted limited axial movement. In contrast, right cam ring 48 is permitted limited rotational movement with respect to cover 32.

An axial face 79 of left cam ring 46, which is opposite adjusting ring 44, includes a plurality of annular ramps 80. Ramps 80 extend the full circumferential extent of left cam ring 46. Each of the ramps 80 extends from a first axial position 82 to a second axial position 84, defining an axially extending ledge 86 in between the ramps.

An axial face 87 of right cam ring 48 includes a plurality of annular ramps 88. The opposite axial face 89 of right cam ring 48 contacts cover 32. Ramps 88 of right cam ring 48 contact ramps 80 of left cam ring 46 and are dimensioned and shaped to conform to ramps 80 for camming. Further, the contacting surfaces of ramps 80 and 88 may optionally include serrations 90. Serrations 90 assist in locking the contacting surfaces together, increasing the frictional resistance between left cam ring 46 and right cam ring 48. Therefore, a greater force is required for right cam ring 48 to rotate with respect to left cam ring 46 without serrations shown with serrations.

Figure 15:
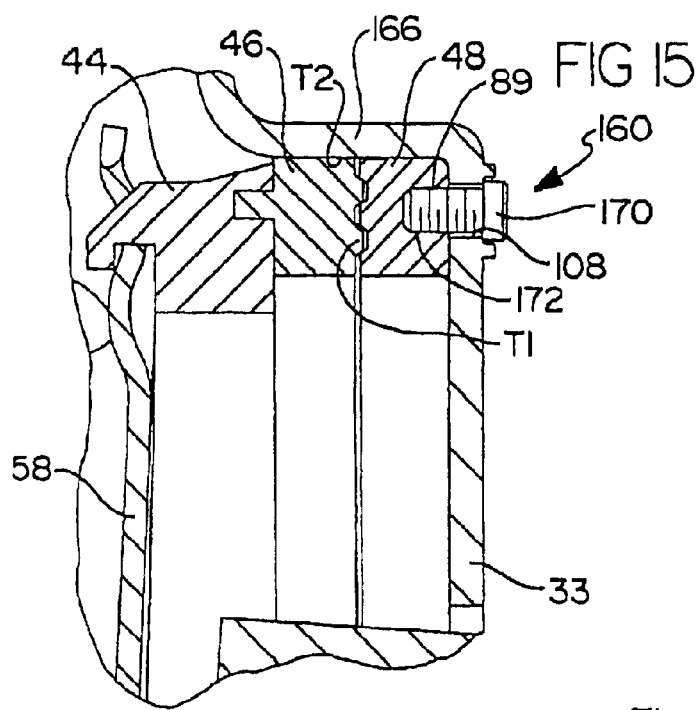
FIG. 15 is an enlarged partial cross-sectional view of an adjustable clutch according to another embodiment of the present invention.
Figure 16:
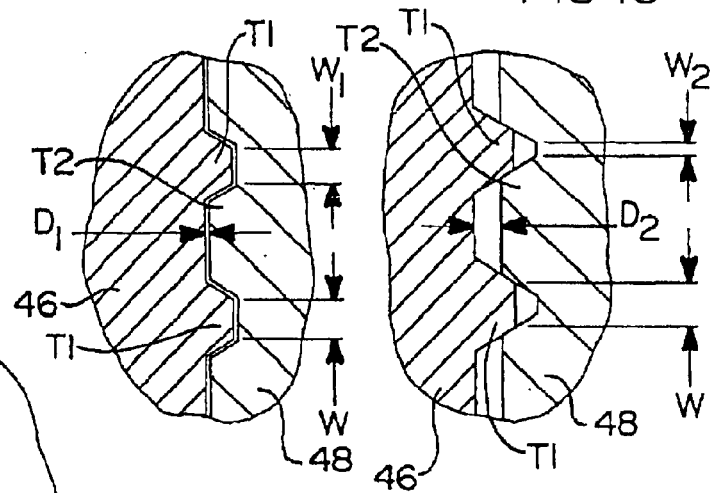
FIG. 16 is a detailed cross-sectional view of the cooperating threaded surfaces provided between the left and right rings.

Alternatively, as shown in FIG. 15, left and right rings 46, 48 may include cooperating threaded surfaces, each having at least one thread that varies in width as it extends around the surface of its respective ring 46, 48. More particularly, a detailed view of left and right cam rings 46, 48 is shown in FIG. 16. In the illustrated embodiment, left ring 46 includes a pair of threads (T1) that mate with a corresponding thread (T2) on right ring 48. In a first position, threads (T1) include an end surface having a width (W) and thread (T2) includes a root having a first width ($w_1$). When right ring 48 rotates from a first position to a second position, as will be described in detail below, the end surface of threads (T1) maintain width (W), and the root of thread (T2) exhibits a second width ($w_2$), which is smaller than the first width ($w_1$). The decrease in width of the root of thread (T2) due to rotation of right ring 48 forces threads (T1) on left ring 46 away from right ring 48, which causes the distance ($D_1$) between left and right rings 46, 48 to increase to a greater distance ($D_2$).

Right cam ring 48 is biased to rotate with respect to cover 32 by a spring assembly 91. Spring assembly 91 includes bracket 92 and spring 94. Bracket 92 is secured to cover 32 by rivets 95. Bracket 92 includes a spring seat 96 at one circumferential end and an arm 98 at the other circumferential end. Spring 94 is received radially inward of right cam ring 48, and extends between seat 96 of bracket 92 and a notch 100 formed in right cam ring 48. Bracket 92 secures one end of spring 94, and assists in maintaining spring 94 in a curved orientation, which provides an inner radial clearance. In so doing, spring 94 may be placed in tension without interfering with other members of the clutch. Preferably, spring 94 is formed from a continuous coil, wherein each end of spring 94 are wound to flair outwardly to define a catch plate at each end of the spring. One end of spring 94 forms a first catch plate 102 which is received within seat 96 of bracket 92, and the other end of spring 94 forms a second catch plate 104, which is received within notch 100.

An indicator tab 106 extends from right cam ring 48 through a circumferentially extending slot 108 in cover 32. Indicator tab 106 indicates the amount that right cam ring 48 has rotated with respect to cover 32, thus indicating the amount of adjustment which has occurred within clutch 20. Indicator tab 106 may also be used to re-set the adjustment mechanism 42 when friction pads 38 are replaced.

As shown in phantom in FIG. 5, counterclockwise rotation of right cam ring 48 applies a tension to spring 94. Under tension, spring 94 applies a biasing force on right cam ring 48 so that right cam ring rotates with respect to left cam ring under conditions required for adjustment. As right cam ring 48 rotates clockwise, ramps 80 and 88 cam against each other, moving adjusting ring 44 from a first axial position to a second axial position, the second axial position being spaced a greater axial distance from wall 33 of cover 32 than the first axial position. This camming increases an axial displacement of left cam ring with respect to right cam ring. The mechanism 42 is designed to stop adjusting when the clutch is fully worn. When the friction surfaces 40 are fully worn, tab 106 contacts an end of slot 108 to prevent further rotation of right cam ring 48.

Figure 6:
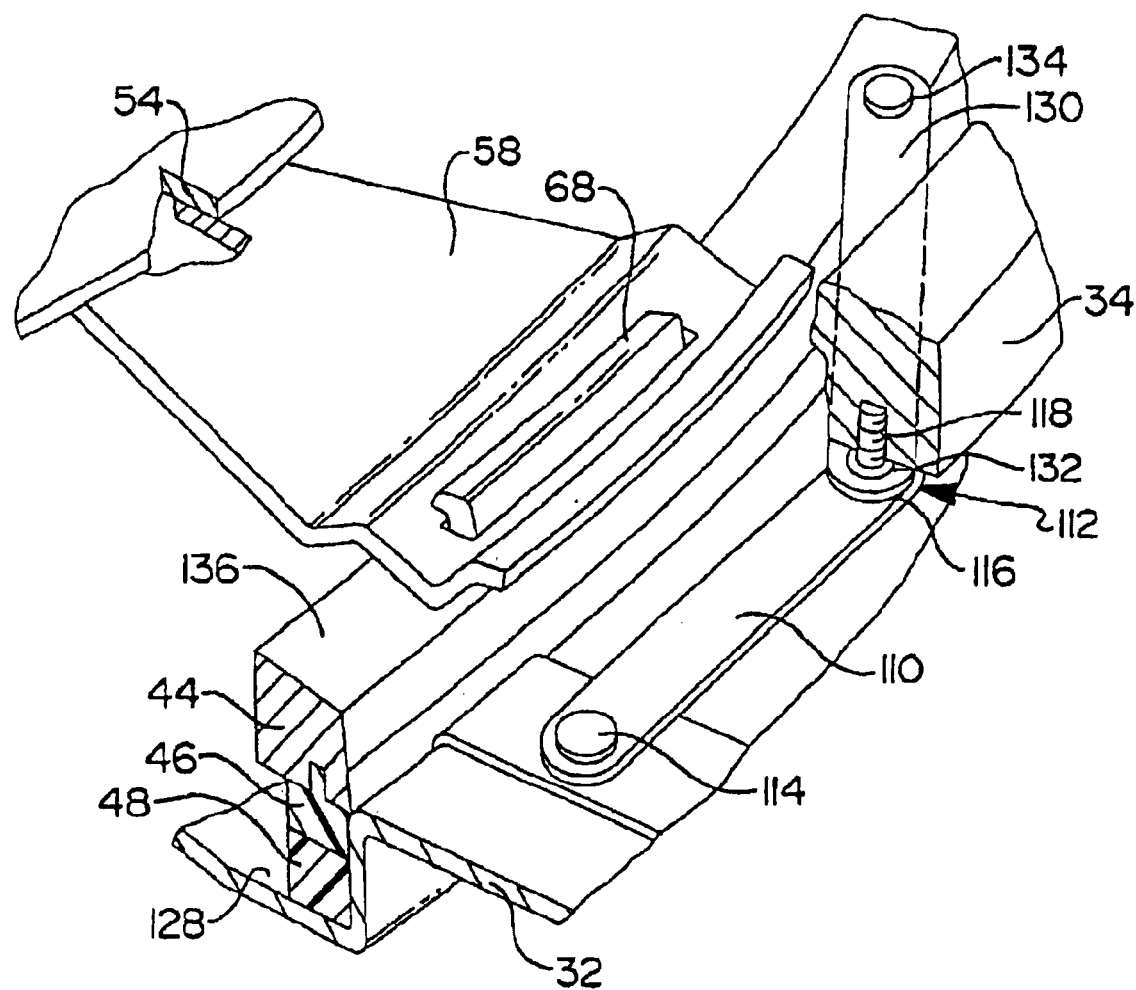
FIG. 6 is a fragmentary perspective view of the adjustable clutch.

As illustrated in FIGS. 3 and 6, pressure plate 34 is attached to cover 32 by a strap 110 and a pin connection assembly 112. For convenience, although a plurality of straps 110 and pin connection assemblies 112 are circumferentially spaced about cover 32, only one set will be described. Each strap 110 extends in a generally circumferential orientation with respect to cover 32. An end 114 of strap 110 is attached to cover 32, while the other end 116 is attached to pressure plate 34 at a location spaced from end 114. Strap 110 is sufficiently flexible to allow pressure plate to be moved axially with respect to cover 32, but is otherwise sufficiently rigid to prevent rotation of pressure plate with respect to cover 32.

As more clearly seen in FIGS. 3 and 7, pin connection assembly 112 includes a pin 118 and pin housing 120. Pin 118 is threadably received in a radially outer portion of pressure plate 34. An opposite end of pin 118 includes an enlarged head 122. Pin housing 120 extends circumferentially about pin 118 between pressure plate 34 and head 122.

A slight clearance 124 is provided between pin housing 120 and head 122 of pin 118 permitting pressure plate 34 a small amount of relative movement. Pressure plate 34 is thereby freely movable an axial distance defined by clearance 124. During normal operation, clearance 124 permits sufficient axial movement of pressure plate with respect to cover 32 to engage and disengage the clutch. Pin housing 120 is received in an aperture 126 of cover 32, forming an interference fit between the outer dimension of pin housing 120 and aperture 126. Pressure plate 34 is movable an additional axial distance defined by the axial dimension of pin housing 120, assuming the force is sufficient to overcome the interference fit between pin housing 120 and cover 32.

FIG. 7 illustrates a radial cross-section of pin connection assembly 120 and strap 110. Clutch 20 is shown in the disengaged position, so clearance 124 is between head 122 of pin 118 and pin housing 120.

Referring again to FIGS. 3 and 6, adjustment mechanism 42 is seated in an annular cavity 128 formed in cover 32 and secured to cover 32 by a strap 130. For convenience, although a plurality of straps 130 are circumferentially spaced about cover 32, only one will be described. Each strap 130 extends in a generally circumferential orientation with respect to cover 32. An end 132 of strap 130 is attached to pressure plate 34 by pin 118, while the other end 134 is attached to axial face 136 of adjusting ring 44 at a location spaced from end 132. Further, end 134 of strap 130 is located radially inwardly of end 132. Strap 130 is sufficiently flexible to allow adjusting ring 44 to be moved axially with respect to cover 32 and pressure plate 34, but is otherwise sufficiently rigid to prevent rotation of adjusting ring 44 with respect to cover 32. Cam ring 48, which is not directly secured to adjusting ring 44 or left cam ring 46, is sandwiched between cover 32 and left cam ring 46.

Strap 130 serves an additional purpose which is to bias adjusting ring 44 towards lever 58, or to the left as shown in FIG. 3. Thus, axial face 136 of adjusting ring 44 applies a leftward force on lever 58. Such force maintains lever 58 in contact with pressure plate 34. Therefore, if release assembly 28 is moved to an extreme right position, a gap will be created between left cam ring 45 and right cam ring 48, as opposed to lever 58 and pressure plate 34. The significance of this will become apparent once the interaction of lever and adjustment mechanism 42 ring is understood.

Clutch 20 is disengaged by rightward movement of release assembly 28, and more specifically, rightward movement of retainer 54. A fully disengaged position of clutch 20 is defined as the position when release assembly 28 contacts a stop, namely transmission housing 55. In an initial condition of clutch 20, prior to wear on friction surface 40 of driven member 36, retainer 54 moves a constant distance from the engaged position to the fully disengaged position of clutch 20. Similarly, pressure plate 34 moves a constant distance from an engaged position to a disengaged position. This distance of travel for pressure plate is approximately 0.040 inch (1.02 mm), assuming no wear on friction surface 40. Pin assembly 112 permits pressure plate to move freely this distance, due to clearance 124.

After wear has occurred on friction surface 40, pressure plate must move an additional axial distance to engage the clutch. This additional increment of travel is shown as "d" and indicated as reference numeral 138. In this intermediate condition of clutch 20, the axial movement of pressure plate exceeds the clearance 124 provided by pin assembly 112. Therefore, in order for pressure plate 34 to move the additional distance "d", pin housing 120 is moved an axial distance "d" relative to cover. Head 122 of pin 118 applies a force on a right end 139 of pin housing 120, as seen in FIG. 3. Pin housing 120 will then move axially to the left relative to cover 32 because the force of coil springs 56 exceeds the force of the interference fit between pin housing 120 and cover 32. The clutch 20 will continue to operate at this position, and will remain unadjusted until release assembly is moved to a fully disengaged position.

Due to pin assembly 112, pressure plate 34 is now spaced from an end of cover 32 by an additional distance "d", as seen in FIG. 7. The pre-adjusted position of cover 32 relative to pressure plate 34 is shown in phantom. The force of the interference fit between pin housing 120 and cover 32 is sufficient to prevent pin housing 120 from moving axially to the right with respect to cover 32. This is due to the relatively weak force which is applied for rightward movement of pressure plate. In contrast, the leftward force applied by coil springs 56 is much greater.

During adjustment, pressure plate 34 contacts a left end 140 of pin housing 120 when release assembly 28 is moved to the fully disengaged position. Pin housing 120 prevents further rightward movement of pressure plate. Strap 130 applies a leftward biasing force on adjusting ring 44 towards pressure plate 34. This biasing force moves adjusting ring 44 and left cam ring 46 to the left, creating gap "d". Gap "d" is created between left cam ring 46 and right cam ring 48.

In response to the gap "d," right cam ring 48 rotates with respect to left cam ring 46 causing camming between ramps 80 and 88. This camming action locks adjusting ring 44 into the position provided by lever 58. In so doing, an extreme left axial end of adjustment mechanism is moved from a first position to a second position, the second position being spaced a greater axial distance from cover 32 than the first position.

Figure 9A:
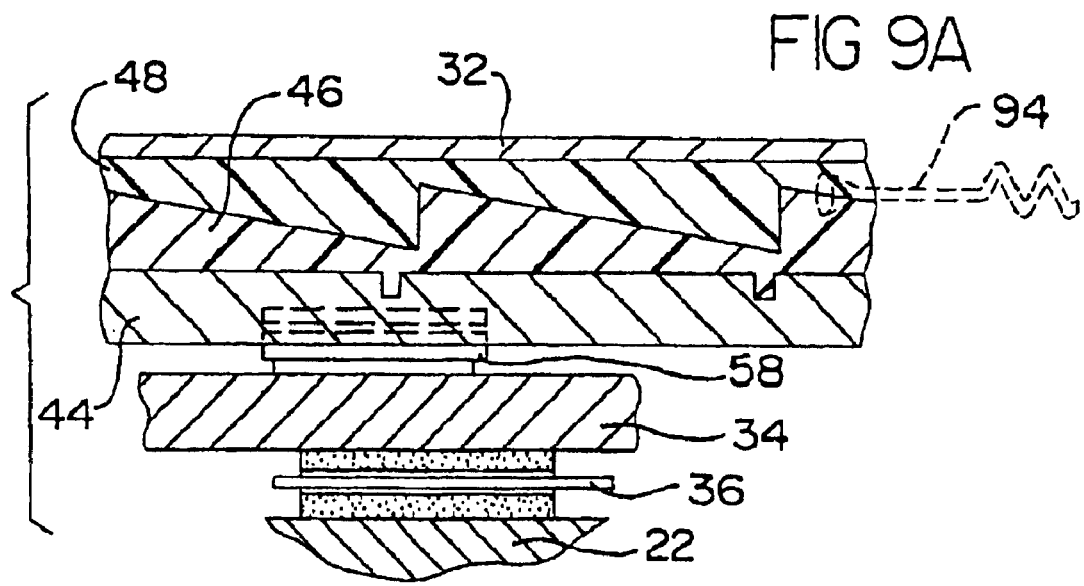
FIG. 9A is a partial radial cross-sectional view of the adjustable clutch shown in an engaged position.
Figure 9B:
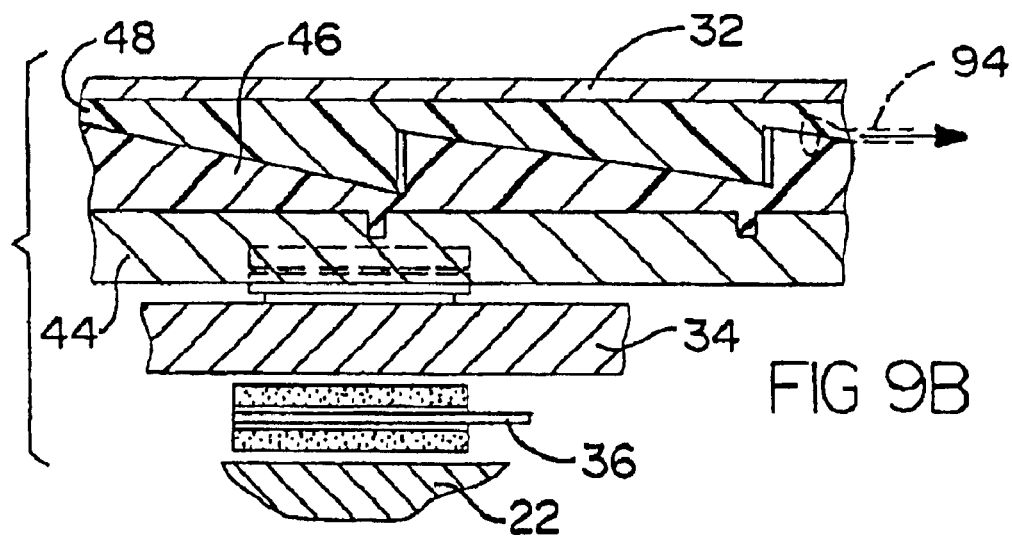
FIG. 9B is a partial radial cross-sectional view of the adjustable clutch shown in an intermediate disengaged position prior to adjustment.
Figure 9C:
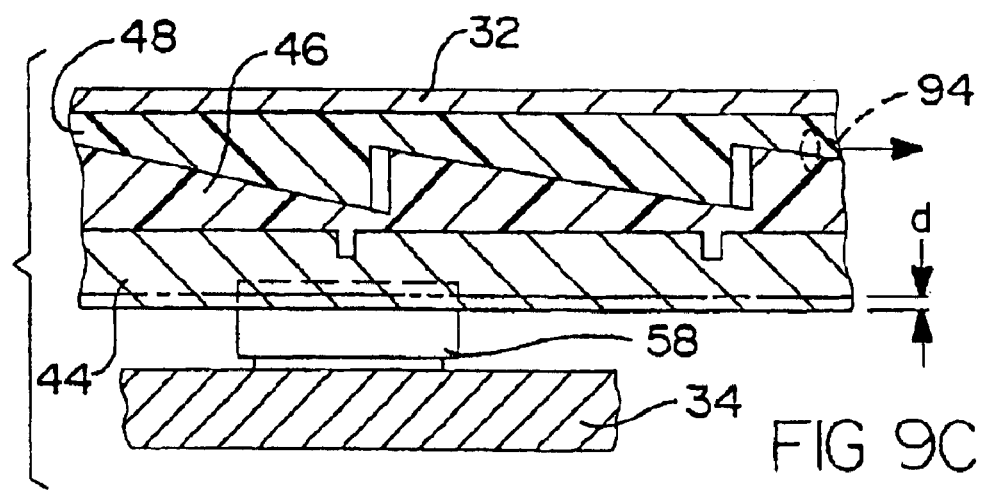
FIG. 9C is a partial radial cross-sectional view of the adjustable clutch shown in a fully disengaged position after adjustment.

Referring now to FIGS. 9A-9C, the camming action of adjustment mechanism 42 is illustrated from another cross-sectional view. Radial cross-sections of the relative position of the clutch members are shown before and after adjustment. The clutch is shown in an engaged position in FIG. 9A, after wear has occurred on friction surface 40 of driven member 36. Because of wear on friction surface 40, pressure plate has moved an additional axial distance in order to engage driven member 36 with flywheel 22.

The clutch is shown in an intermediate disengaged position in FIG. 9B. In this intermediate position, adjustment mechanism 42 has not yet been activated to adjust clutch 20 in response to the wear on friction surface 40. The clutch will operate unadjusted until it is fully disengaged.

Clutch 20 is shown in the fully disengaged position in FIG. 9C after adjustment. When clutch 20 is fully disengaged, pull assembly 52 of release assembly 28 contacts transmission housing 55, which is the extreme right position for release assembly 28, as shown in FIG. 3. The radially outer portion 64 of lever 58 leverages adjusting ring away from cover 32, and creates a gap between left cam ring 46 and right cam ring 48. The biasing forces on right cam ring 48 caused by spring 94 urges the rotation of right cam ring 48. This, in turn, results in camming along ramps 80 and 88 to increase the axial displacement of adjustment mechanism 42 to fill the gap.

The above-described operation illustrates the automatic adjustment capabilities of clutch 20. However, to selectively render clutch 20 manually adjustable, clutch 20 is provided with an adjustment limiting member 160 for controlling adjustment of adjustment mechanism 42. Referring again to FIG. 3, an embodiment of adjustment limiting member 160 is shown that includes at least one threaded bolt 162 received in a threaded aperture 164 of cover 32. In the disclosed embodiment, a first bolt 162A extends through an axially extending wall 166 in cover 32 to engage an outer surface of right cam ring 48. Alternatively, or in combination with bolt 162A, a second bolt 162B may extend through radially extending wall 33 to engage axial face 89 of right cam ring 48, as also shown in FIG. 3.

To permit automatic adjustment of clutch 20, bolt 162 can be selectively moved into and out of engagement with right cam ring 48 by rotating bolt 162. When bolt 162 is disengaged from right cam ring 48, clutch 20 is free to automatically adjust, as described above, provided clutch 20 is fully disengaged. However, when bolt 162 is engaged with right cam ring 48, bolt 162 inhibits rotation of right cam ring 48 with respect to cover 32, which prevents adjustment mechanism 40 from automatically adjusting clutch 20.

Optionally, clutch 20 may be configured without spring 94. When so configured, clutch 20 is manually adjusted by first disengaging bolt 162 from right cam ring 48 and then manually rotating right cam ring 48 with respect to cover 32 and left cam ring 46. For example, right cam ring 48 can be manually rotated by pushing cam tab 106 in circumferentially extending slot 108 when clutch 20 is fully disengaged.

Referring to FIGS. 10 and 11, another embodiment of adjustment limiting member 160 is shown. Adjustment limiting member 160, along with wear indicator tab 106, extends through circumferentially extending slot 108 in cover 32. In the disclosed embodiment, adjustment limiting member 160 is a threaded bolt 170 that is received in a threaded aperture 172 in axial face 89 of right cam ring 48. However, any rigid, removable member, such as a pressed-fit pin, may also suitably function as rotation limiting member 160.

As shown in FIG. 11, when the friction surfaces 40 are new, tab 106 rests in one end of slot 108 and adjustment limiting member 160 contacts the other end to inhibit rotation of right cam ring 48. To permit automatic adjustment of clutch 20, adjustment limiting member 160 is removed from right cam ring 48, permitting right cam ring 48 to rotate and clutch 20 to automatically adjust as described above. Optionally, as noted above, spring 94 may be removed from clutch 20 requiring right cam ring 48 to be manually rotated to adjust clutch 20. For example, right cam ring 48 can be manually rotated by removing adjustment limiting member 160 and pushing cam tab 106 in circumferentially extending slot 108 when clutch 20 is fully disengaged.

Figure 12:
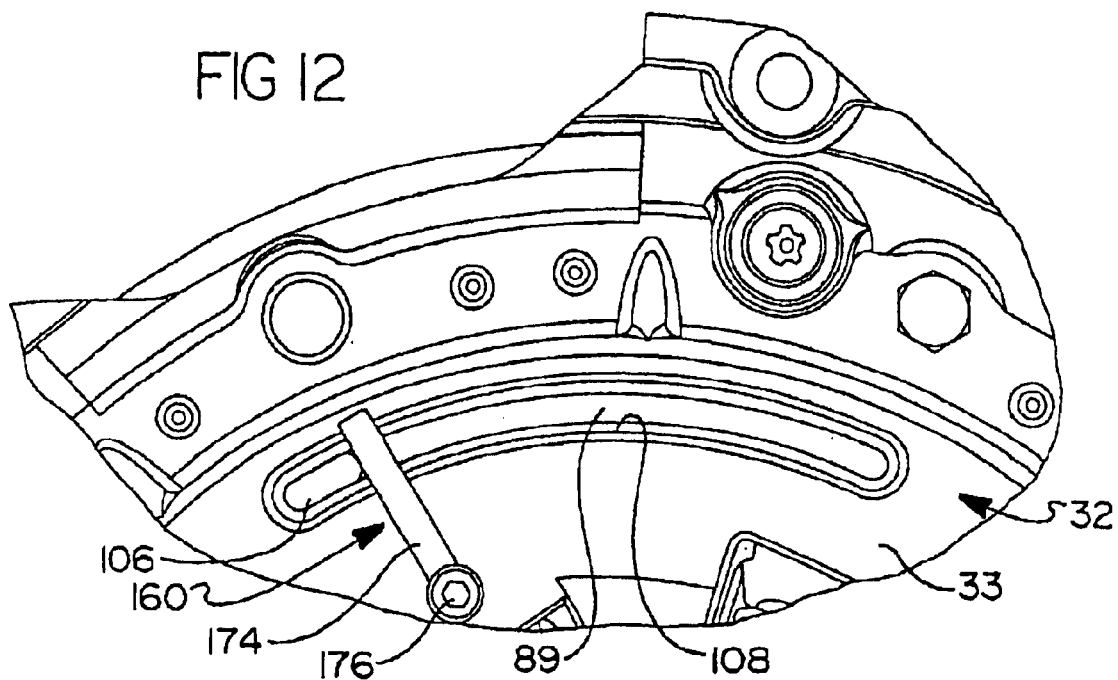
FIG. 12 is an enlarged partial elevation view of an adjustable clutch according to another embodiment of the present invention, illustrating the clutch cover, indicator tab and adjustment limiting member.

Referring to FIG. 12 another embodiment of adjustment limiting member 160 is shown. In this embodiment, adjustment limiting member 160 includes an elongated locking strap 174 secured to radially extending wall 33 of cover 32. In the disclosed embodiment, locking strap 174 is a thin metal ribbon that is secured to radially extending wall 33 using a fastener 176, such as a threaded bolt. Locking strap 174 abuts an edge of tab 106 and inhibits rotation of tab 106 and right cam ring 48 within cover 32. A standard lock washer (not shown) may be disposed between locking strap 174 and cover 32 to further inhibit rotation of locking strap 174 during operation of clutch 20. Alternatively, a distal end of locking tab 106 may also be secured to cover 32 using a second bolt (not shown).

Figure 13:
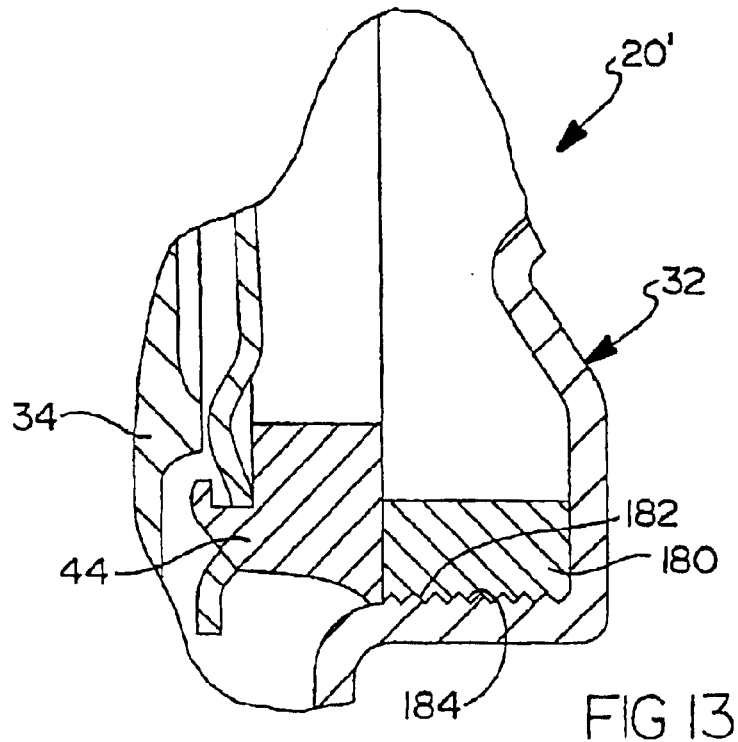
FIG. 13 is an enlarged partial cross-sectional view of an adjustable clutch according to another embodiment of the present invention.
Figure 14:
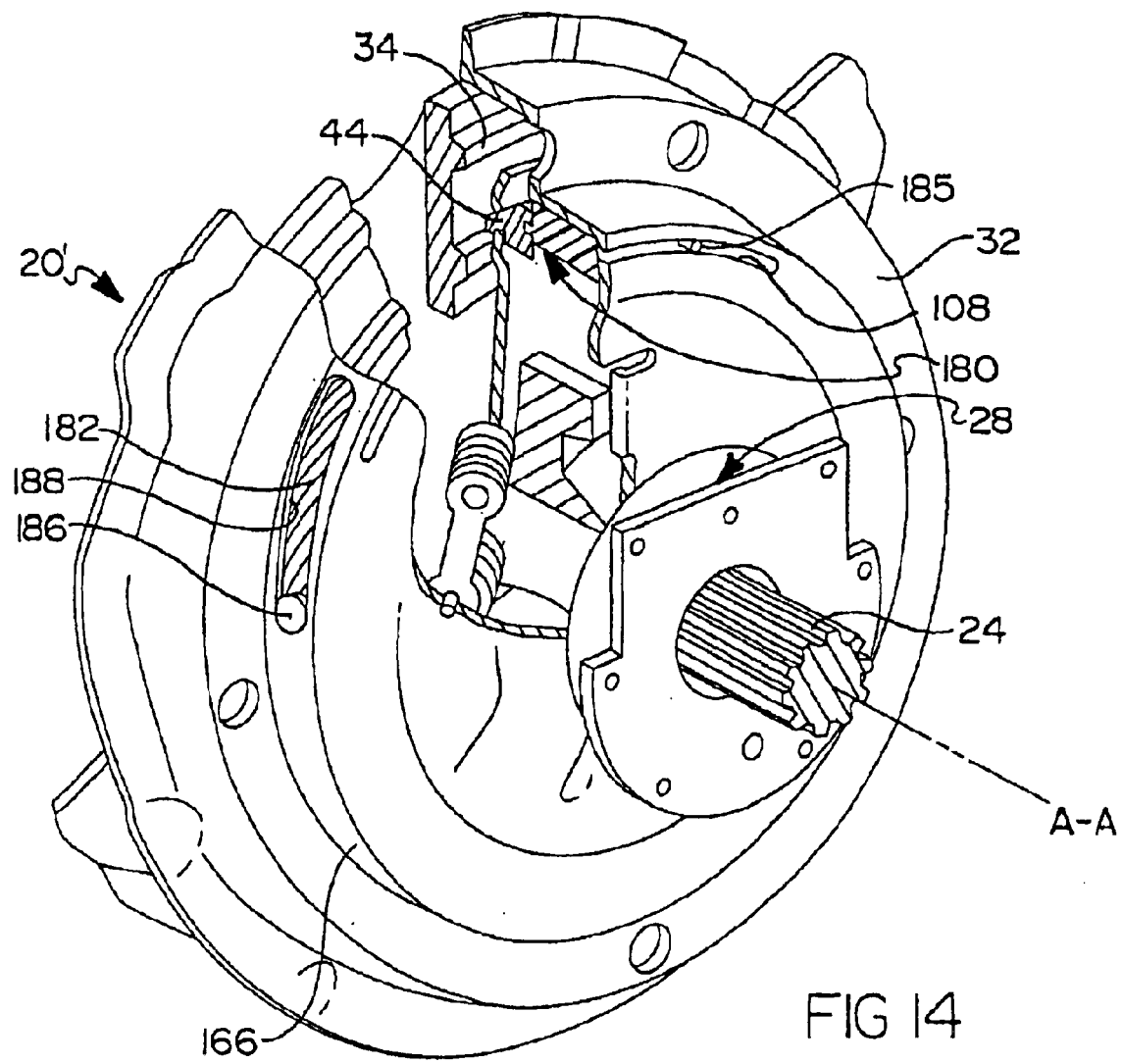
FIG. 14 is a perspective view of the adjustable clutch partially depicted in FIG. 13.
Figure 17:
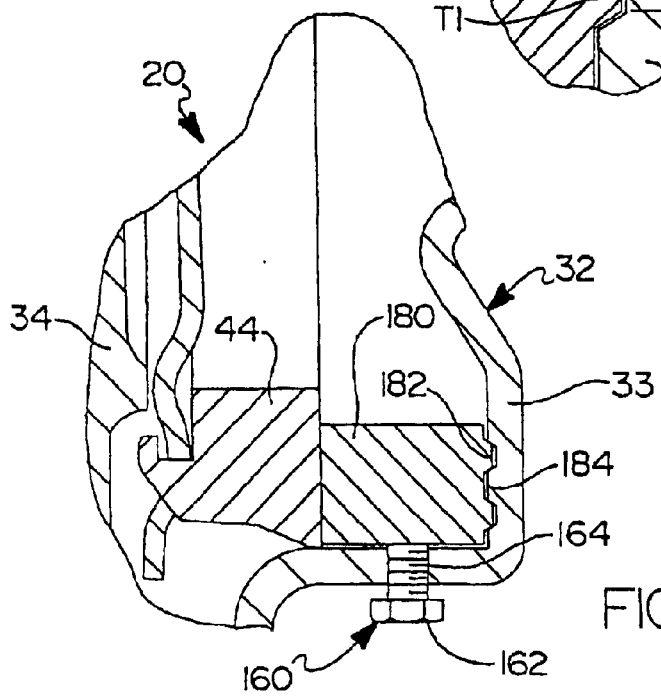
FIG. 17 is an enlarged partial cross-sectional view of an adjustable clutch according to another embodiment of the present invention.

Referring to FIGS. 13 and 14, another embodiment of the present invention is shown. In this embodiment, a clutch 20' is provided that is substantially similar to clutch 20 with at least one exception, namely, clutch 20' does not include cooperating cam rings 46 and 48. In place of cam rings 46, 48 is provided a first annular adjusting ring 180 that abuts the second adjusting ring 44. Adjusting ring 180 includes an adjusting thread 182 at an outer peripheral surface and cover 32 includes a cover thread 184 at an inner peripheral surface thereof that mates with adjusting thread 182. Threads 182, 184 may be of the buttress-type when disposed in the outer axially extending surface of adjusting ring 180 and inner axially extending surface of cover 32, as shown in FIG. 13. Alternatively, threads 182, 184 may exhibit a varying width, as described above and illustrated in FIG. 16, when disposed in rightward radially extending surface of first adjusting ring 180 and radially extending wall 33 of cover 32 (FIG. 17). Threads 184 can be machined into cover 32 during remanufacture of clutch 20 to convert clutch 20 described above into the clutch 20' illustrated in FIGS. 13, 14 and 17.

Like right cam ring 48, first adjusting ring 180 may include an indicator tab 185 (FIG. 14) that extends through a circumferentially extending slot 108 in cover 32. During manual adjustment of clutch 20', indicator tab 185 may be used to rotate first adjusting ring 180. Rotation of first adjusting ring 180 pushes second adjusting ring 44 and pressure plate 34 to the left to reduce the axial distance pressure plate 34 must move during engagement of clutch 20' due to wear on friction surfaces 40.

Alternatively, or in combination with indicator tab 185, first adjusting ring 180 may be provided with an adjustment tab 186 that is secured to and extends radially outwardly therefrom, as shown in FIG. 14. When so configured, cover 32 includes a circumferentially extending slot 188 in axially extending wall 166 to allow passage and movement of adjustment tab 186. During manual adjustment of clutch 20', adjustment tab 186 may be used to rotate first adjusting ring 180. If needed, a tool (not shown) may also be used to engage adjustment tab 186 to offer a mechanic leverage to rotate first adjusting ring 180 within cover 32.

Optionally, as shown in FIG. 17, clutch 20' may include an adjustment limiting member 160. In the illustrated embodiment, adjustment limiting member 160 includes a threaded bolt 162 that is received in a threaded aperture 164 in cover 32 and is rotatable into and out of engagement with a peripheral surface of first adjusting ring 180. However, clutch 160 can include other configurations of adjustment limiting member 160 to inhibit rotation of first adjusting ring 180, including the configurations shown in FIGS. 11 and 12 of this disclosure.

It will be appreciated that adjustment limiting member 160 and adjusting ring 180 may be initially manufactured with clutch 20 or conveniently installed in clutch 20 during remanufacture. Accordingly, the present invention provides a cost-effective way of configuring a friction torque device for automatic and/or manual adjustment.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A friction torque device disposed between a driving member and an axially extended driven shaft comprising:
   a cover fixed to the driving member for unitary rotation therewith;
   a first ring rotatable relative to both a pressure plate and to the cover and axially fixed relative to the cover;
   a second ring engaging the first ring on a side of the first ring opposite the cover and rotatably fixed relative to the cover, wherein the first and second rings cooperatively control an axial displacement of the pressure plate relative to the cover as a function of relative rotative position;
   an adjustment limiting member selectively engagable with the first ring to inhibit rotation of the first ring relative to the pressure plate and the cover;
   the pressure plate rotatably coupled to the cover for rotation therewith;
   a retainer slidably disposed over the driven shaft for axial translation therealong;
   a radially extending lever pivotably engaging the retainer and slidably engaging the pressure plate;
   an apply spring functionally disposed between the cover and the retainer biasing the retainer and therefore the pressure plate toward the driving member and an engaged position;
   a bias spring of lower force than the apply spring functionally disposed between the cover and the pressure plate biasing the pressure plate toward the cover and a disengaged position; and
   a driven member having a friction surface and coupled to the driven shaft for rotation therewith, the friction surface interposed between the driving member and the pressure plate, the pressure plate responsive to the apply spring operably clamping the driven member between the pressure plate and the driving member for rotation therewith.

2. The friction torque device of claim 1 further including an adjusting spring functionally disposed between the first ring and the second ring and rotatably biasing the first ring with respect to the second ring in a first rotative direction to increase the axial displacement between the first and second rings when permitted by the adjustment limiting member.

3. The friction torque device of claim 1, wherein the adjustment limiting member is a threaded bolt.

4. The friction torque device of claim 1, wherein the adjustment limiting member is disposed in the cover and is moveable with respect to the cover to engage the first ring.

5. The friction torque device of claim 1, wherein the adjustment limiting member selectively engages an axially extending surface of the first ring.

6. The friction torque device of claim 1, wherein the adjustment limiting member selectively engages a radially extending surface of the first ring.

7. The friction torque device of claim 1, wherein the adjustment limiting member is secured to the first ring and extends through a slot in the cover, the adjustment limiting member engaging an end of the slot to inhibit rotation of the first ring.

8. The friction torque device of claim 7, wherein the adjustment limiting member is a threaded bolt.

9. The friction torque device of claim 1, wherein the adjustment limiting member includes a locking strap removably secured to the cover, the locking strap engaging a tab on the first ring to inhibit rotation thereof.

10. The friction torque device of claim 9, wherein the locking strap is a metal ribbon that is removably secured to the cover with a threaded bolt.

11. The friction torque device of claim 1, wherein the first and second rings include cooperating cam surfaces.

12. The friction torque device of claim 1, wherein the first and second rings include cooperating threaded surfaces.

13. The friction torque device of claim 12, wherein the threaded surfaces include a least one thread that varies in width.

14. A friction torque device disposed between a driving member and an axially extended driven shaft comprising:

a cover fixed to the driving member for unitary rotation therewith, the cover including a threaded inner surface;

an adjusting ring including a threaded outer surface meshed with the threaded inner surface of the cover, the adjusting ring having an adjusting thread at an outer peripheral surface and the cover having a cover thread at an inner peripheral surface, the adjusting thread mating with the cover thread such that the adjusting ring is selectively rotatable relative to both a pressure plate and to the cover and moveable in an axial direction relative to the cover in response to rotation, wherein the adjusting ring controls an axial displacement of the pressure plate relative to the cover as a function of relative rotative position;

the pressure plate rotatably coupled to the cover for rotation therewith;

a retainer slidably disposed over the driven shaft for axial translation therealong;

a radially extending lever pivotably engaging both the retainer and a second adjusting ring and slidably engaging the pressure plate;

an apply spring functionally disposed between the cover and the retainer biasing the retainer and the pressure plate toward the driving member and an engaged position;

a bias spring of lower force than the apply spring functionally disposed between the cover and the pressure plate biasing the pressure plate toward the cover and a disengaged position; and a driven member having a friction surface and coupled to the driven shaft for rotation therewith, the friction surface interposed between the driving member and the pressure plate, the pressure plate responsive to the apply spring operably clamping the driven member between the pressure plate and the driving member for rotation therewith.

15. The friction torque device of claim 14 further including an adjustment limiting member selectively engagable with the adjusting ring to inhibit rotation of the adjusting ring relative to the pressure plate and the cover.

16. The friction torque device of claim 14, wherein the adjusting thread and the cover thread vary in width.

17. The friction torque device of claim 14, wherein the adjusting ring includes an adjustment tab that extends through a slot in the cover.

18. The friction torque device of claim 14, wherein the adjusting ring includes an indicator tab that extends through a slot in the cover.

* * * * *